Feb. 28, 1950 H. K. EDLUND ET AL 2,499,136
REAR SEAT WINDSHIELD FOR CONVERTIBLES
Filed Aug. 18, 1948 6 Sheets-Sheet 3

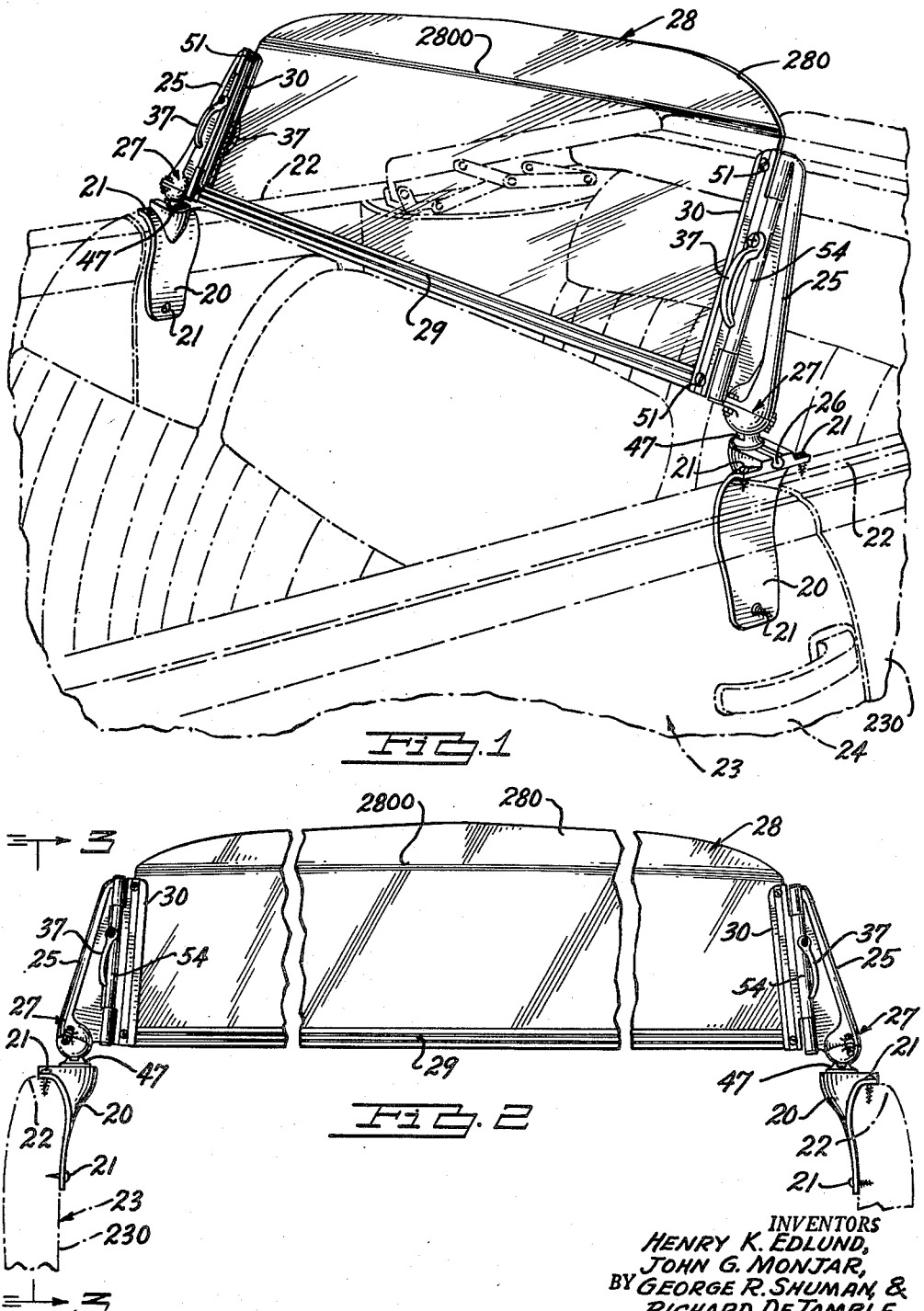

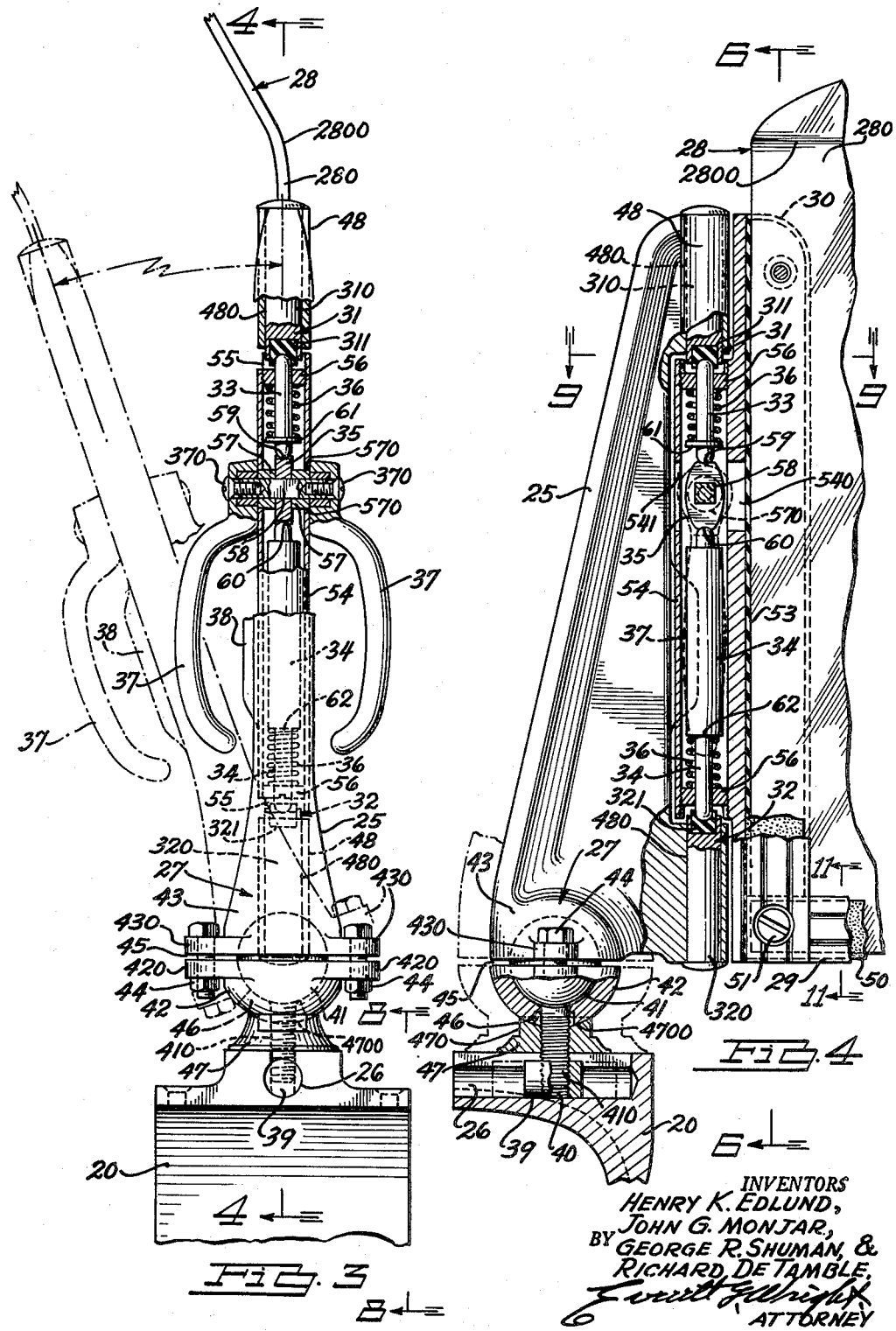

INVENTORS
HENRY K. EDLUND,
JOHN G. MONJAR,
BY GEORGE R. SHUMAN, &
RICHARD DE TAMBLE.
ATTORNEY

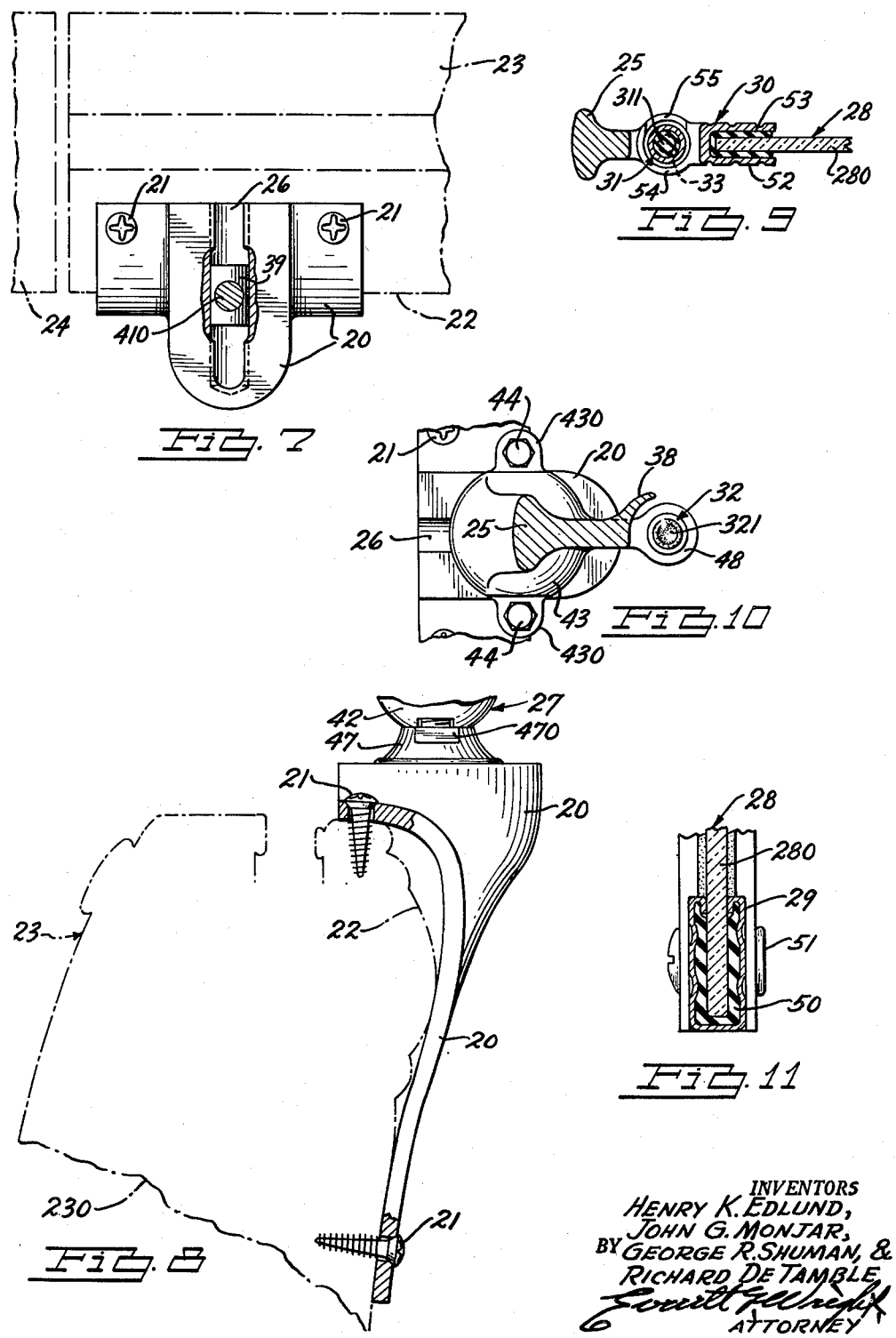

Feb. 28, 1950     H. K. EDLUND ET AL     2,499,136
REAR SEAT WINDSHIELD FOR CONVERTIBLES
Filed Aug. 18, 1948     6 Sheets-Sheet 5
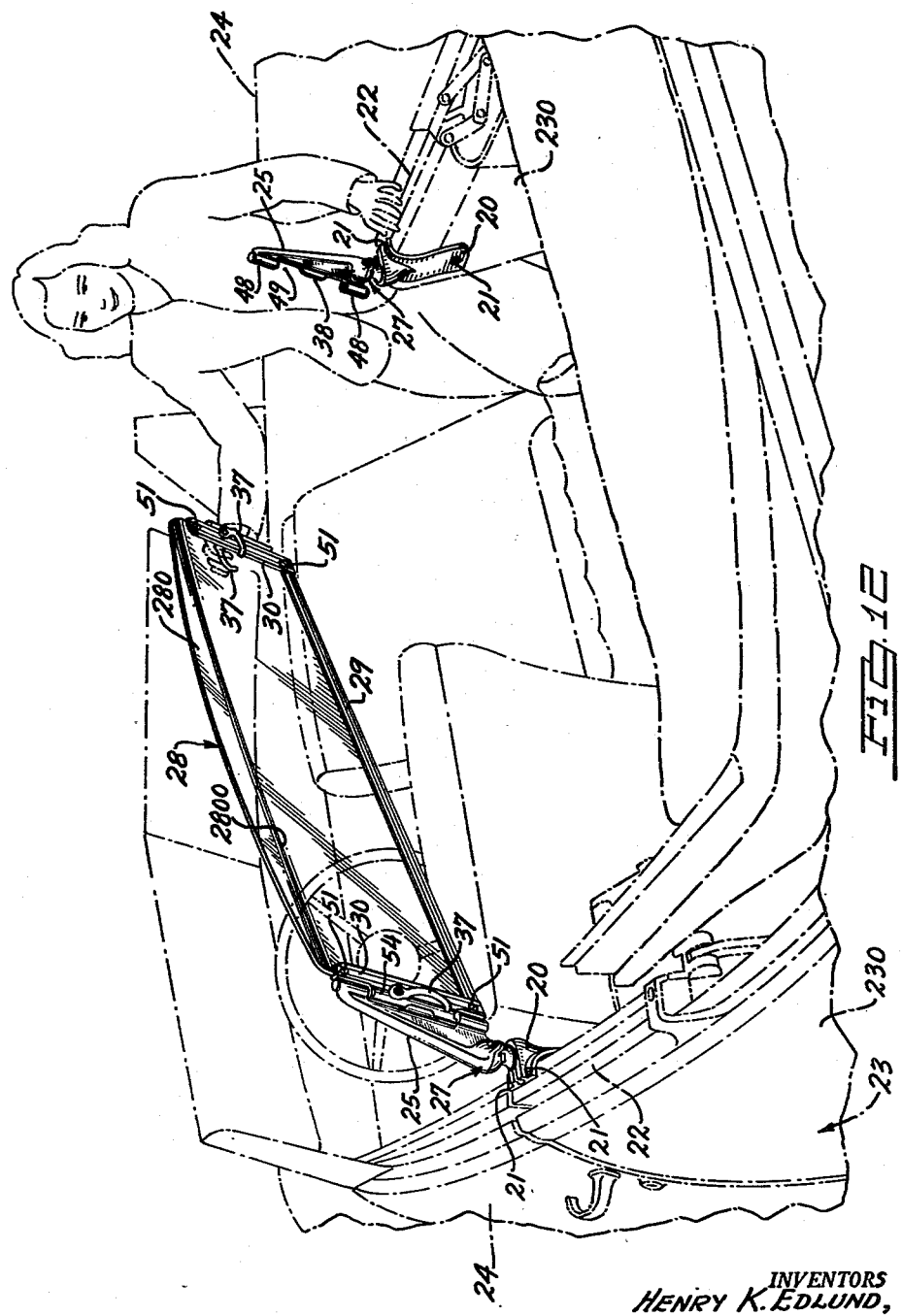
INVENTORS
HENRY K. EDLUND,
JOHN G. MONJAR,
BY GEORGE R. SHUMAN, &
RICHARD DE TAMBLE
ATTORNEY Feb. 28, 1950     H. K. EDLUND ET AL     2,499,136
REAR SEAT WINDSHIELD FOR CONVERTIBLES
Filed Aug. 18, 1948     6 Sheets-Sheet 6
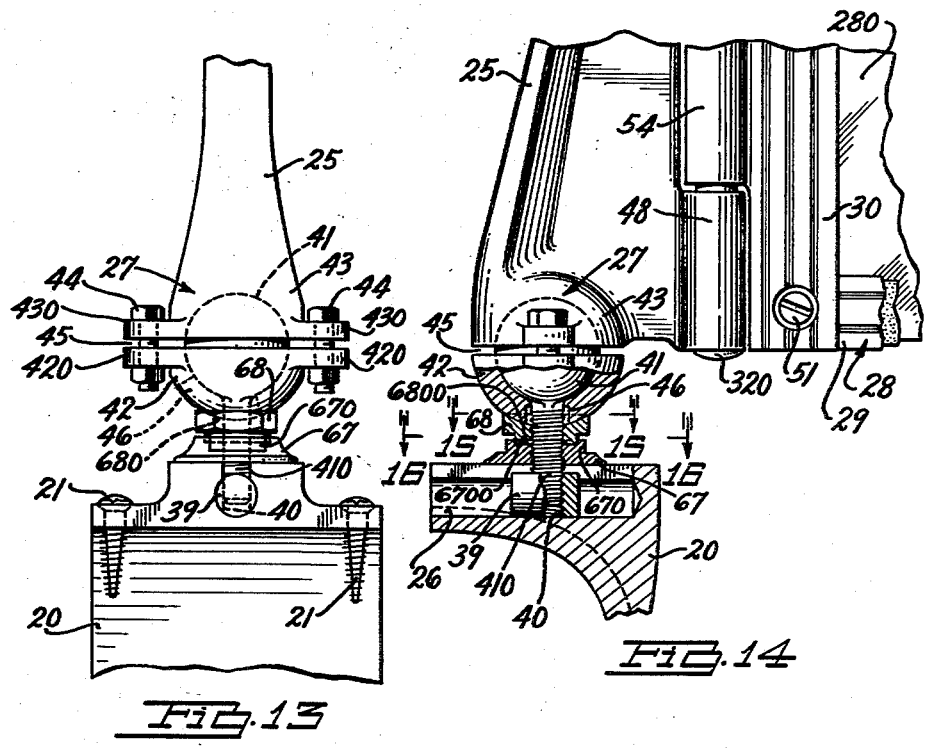
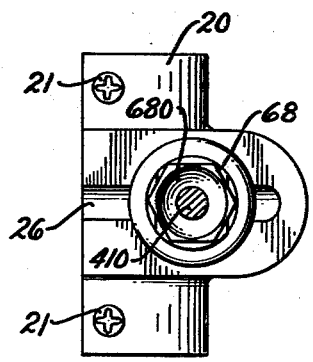
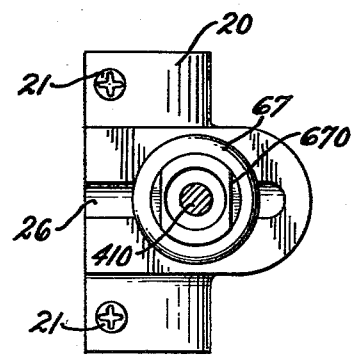
INVENTORS
HENRY K. EDLUND,
JOHN G. MONJAR,
BY GEORGE R. SHUMAN, &
RICHARD DE TAMBLE
ATTORNEY Patented Feb. 28, 1950

2,499,136

UNITED STATES PATENT OFFICE 2,499,136

REAR SEAT WINDSHIELD FOR CONVERTIBLES

Henry K. Edlund, John G. Monjar, George R. Shuman, and Richard De Tamble, Detroit, Mich., assignors to Tonno-Shield Corporation, a corporation of Michigan Application August 18, 1948, Serial No. 44,854

20 Claims. (Cl. 296—85)

This invention relates to windshields for the rear seat of automobiles of the body style commonly called "convertibles."

Among the undesirable features of a convertible during use with its top Down are back drafts on the driver and occupants riding in the front seat, and the wind blast, wind burn and dust experienced by passengers in the rear seat. The foregoing and other hazards to occupants of a convertible style automobile creates a sales resistance thereto particularly because of unpleasantness experienced by the driver and passengers when the convertible is used in weather conditions other than ideal. Back seat passengers do not enjoy the convertible body style of automobiles because of the discomfort resulting from air currents and dust swirling around them. Therefore, it is difficult for the owner or driver to ask guests to ride in the back seat of a convertible except for a short period of time.

With the foregoing in view, the primary object of the invention is to provide a rear seat windshield for automobiles of the convertible body style which provides passengers therein with the same comfort as accommodated to passengers riding in the front seat of the convertible.

Another object of the invention is to provide a windshield for the rear seat of a convertible which not only protects the rear seat passengers from the wind blast and chills resulting from fast driving but reduces to a minimum the back-draft on the driver of the convertible and the front seat passengers.

Another object of the invention is to provide a rear seat windshield for convertibles which may be readily and effectively mounted on the side body panels of the convertible rearward of the door on each side thereof in such a manner as to give easy and ready ingress and egress to and from the rear seat of the convertible from either side thereof.

Another object of the invention is to provide a rear seat windshield for convertibles having brackets for mounting the same on the side panels of the convertible which compensate for variations in the distances between side panels normally present in automobile body construction.

Another object of the invention is to provide a rear seat windshield for convertibles which may be fixed to the desired rearward slope and easily swung open from either side of the automobile.

Another object of the invention is to provide a rear seat windshield for convertibles formed of Plexiglas or like plastic material having a frame around the sides and bottom thereof hingedly connected to stanchions at the sides thereof fixed to the side panels of the convertible, the said Plexiglas being unsupported across the top of the windshield and curved to provide adequate visibility therethrough and at the same time provide both strength at the top of the windshield and proper deflection of air currents over the top thereof.

Another object of the invention is to provide a windshield for the rear seat of a convertible which is hingedly mounted on novel and conveniently operable hardware fixed to the side panels of the convertible rearward of the doors thereof which permits passengers to enter and leave the rear seat of the convertible with ease and comfort and without interference with the top of the convertible if and when it is in its Up position.

Another object of the invention is to provide a windshield for the rear seat of a convertible which can be easily and readily installed in any convertible even though the distance between and vertical attitude of the side panels thereof may vary considerably as between convertibles of the same make and year model.

Other objects of the invention will become apparent by reference to the following detailed description taken in connection with the accompanying drawings, in which:

Figure 1 is a view in perspective showing a rear seat windshield for convertibles mounted on a convertible, the said convertible body being shown in dot and dash lines.

Fig. 2 is a front elevational view of a windshield for convertibles, the side panels of the convertible body on which it is mounted being shown in dot and dash lines.

Fig. 3 is an enlarged side elevational view taken on the line 3—3 of Fig. 2, the dot and dash lines indicating how the windshield may be mounted in a rearwardly sloping position.

Fig. 4 is a vertical sectional view taken on the line 4—4 of Fig. 3.

Fig. 7 is a horizontal sectional view taken on the line 7—7 of Fig. 6, a side panel of a convertible being shown in dot and dash lines.

Fig. 8 is a vertical sectional view taken on the line 8—8 of Fig. 3, a side panel of a convertible on which the windshield bracket is mounted being shown in dot and dash lines.

Fig. 9 is a fragmentary horizontal sectional view taken on the line 9—9 of Fig. 4.

Fig. 10 is a horizontal sectional view taken on the line 10—10 of Fig. 5.

Fig. 11 is a detailed vertical sectional view taken on the line 11—11 of Fig. 4.

Fig. 12 is a view in perspective of the windshield for convertibles embodying the invention mounted on a convertible showing a passenger entering the rear seat of the convertible.

Fig. 13 is a fragmentary enlarged side elevational view similar to Fig. 3 showing an alternate means for securing the stanchions employed to support a windshield for convertibles embodying the invention in the desired fixed position on the top rails of side panels of a convertible body.

Fig. 14 is a fragmentary sectional view taken on the line 14—14 of Fig. 13.

Fig. 15 is a horizontal sectional view taken on the line 15—15 of Fig. 14.

Fig. 16 is a horizontal sectional view taken on the line 16—16 of Fig. 14.

Figures 5, 6:
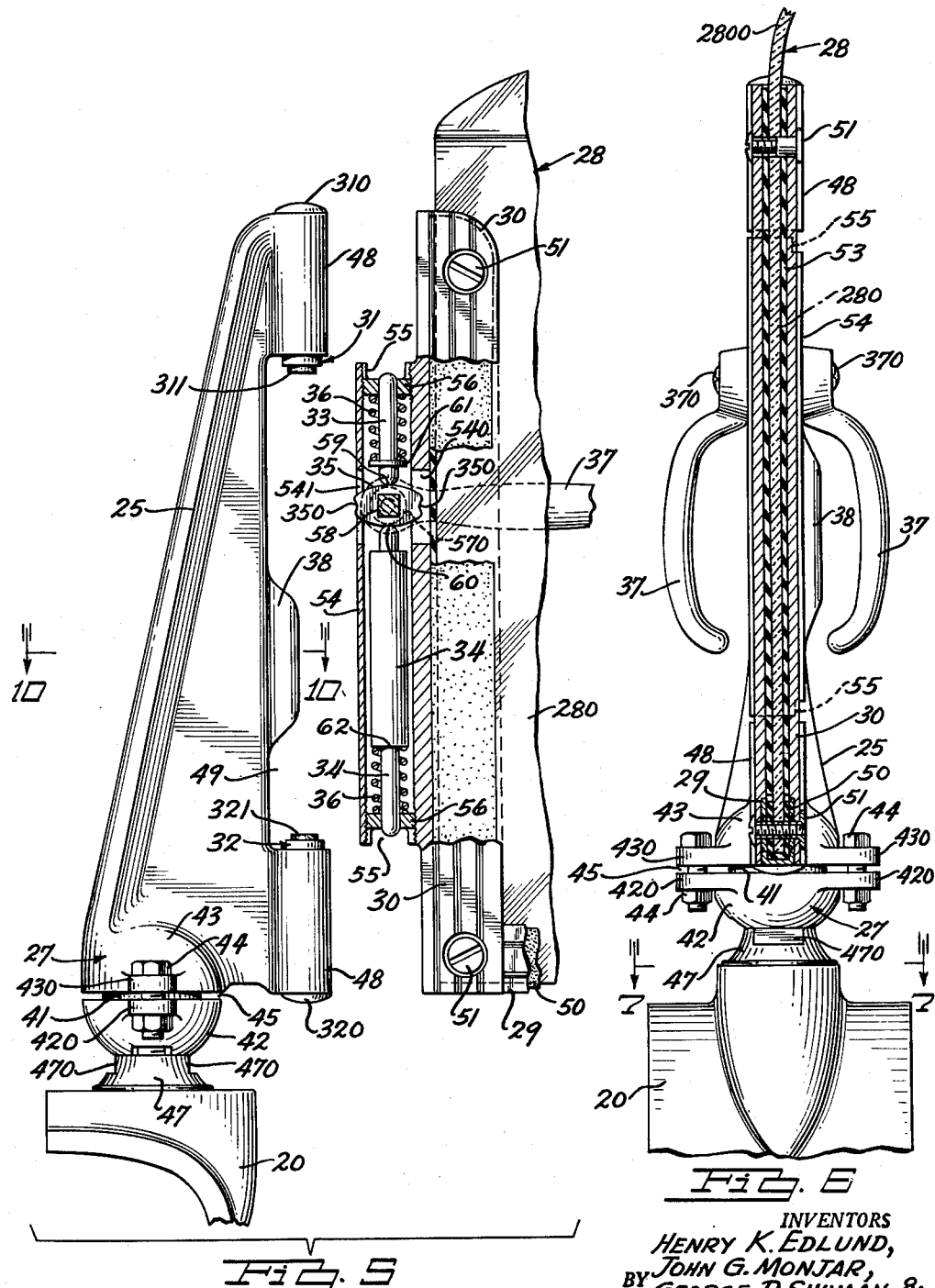
Fig. 5 is an exploded view part in elevation and part in section showing the stanchion and bracket and the novel end frame and latch hardware preferably employed.
Fig. 6 is a vertical sectional view taken on the line 6—6 of Fig. 4.

Referring now to the drawings wherein like numerals refer to like and corresponding parts throughout the several views, the particular embodiment of a windshield for convertibles shown in the drawings for the purpose of illustrating the invention comprises, in general, of a pair of brackets 20 secured by self tapping screws or the like 21 to the top rail 22 of the side panel 230 of the body 23 of a convertible rearwardly of the door 24 thereof, a stanchion 25 fixed to each of the brackets 20 adjustable laterally in a T-slot or guide 26 provided in each bracket 20 and pivotably adjustable in a ball and socket joint 27 prior to fixation therein, a transparent windshield 28 preferably of a plastic such as Plexiglas or the like 280 mounted in a bottom frame 29 and end frames 30, and an upper fixed pivot 31 and a lower fixed pivot 32 mounted in each bracket 20 on which pivots 31 and 32 the windshield 28 is swingably mounted, an upper retractable pivot pin 33 and a lower retractable pivot pin 34 reciprocatingly mounted in each end frame 30, a cam 35 turnably mounted in each end frame between the said upper and lower retractable pivot pins 33 and 34, springs 36 constantly urging the said retractable pivot pins 33 and 34 upwardly and downwardly respectively into engagement within the said upper and lower pivots 31 and 32 respectively, operating handles 37 disposed on each side of each end frame 30 keyed to the said cam 35 whereby to turn the said cam 35 to a vertical position to extend the said retractable pivot pins 33 and 34 into engagement with the upper and lower pivots 31 and 32 respectively or to turn the said cam 35 to a horizontal position to permit the said retractable pivot pins 33 and 34 to retract under pressure of the compression springs 36 out of engagement with the said upper and lower pivots 31 and 32, the said cams 35 each having lands 350 formed in opposite ends thereof whereby to releasably retain the said retractable pivot pins 34 and 35 in engagement with opposed upper and lower pivots 31 and 32 respectively, and a stop 38 on each stanchion 25 serving to limit the rearward movement of the windshield 28 past the center of the stanchions 25.

The brackets 20 are formed to conform to the contour of the top rail 22 of the side panel 230 of the convertible body 23 and are secured thereto facing each other on opposite sides of the convertible body 23 rearwardly of the doors 24 thereof by such suitable means as self tapping screws 21. Because of the fact that variations exist in the width of convertible bodies of the same make and year models and to make the windshield 28 fit more than one model, the brackets 20 are preferably provided with T-slots 26 into which a cylindrical anchorage pin 39 is telescoped. The said cylindrical anchorage pin 39 is provided with a threaded aperture 40 diametrically therethrough into which is threaded the threaded stem 410 of the ball 41 of the ball and socket joint 27.

The ball and socket joint 27 is composed of the ball 41 having a threaded depending stem 410, a semi-spherical lower half socket 42 and a semi-spherical upper half socket 43, the latter being formed integral with the bottom of the stanchion 25. The lower half socket 42 and the upper half socket 43 are each provided with apertured ears 420 and 430 respectively through which securing studs 44 are located. The said lower half socket 42 and the said upper half socket 43 are semi-spherically domed on their inner surfaces and are sufficiently shallow that the joint 45 therebetween will not close thereby causing the said half sockets 42 and 43 to squeeze tightly on and become fixed to the ball 41 when the securing studs 44 are tightened. The bottom of the lower half socket 42 is provided with a slotted aperture 46 therein through which the threaded stem 410 of the ball 41 telescopes. An anchorage nut 47 having flattened sides 470 to accommodate a wrench and a concaved top 4700 to accommodate the semi-spherical lower half socket 42 is threaded onto the threaded stem 410 of the ball 41 before the said threaded stem 410 of the ball 41 is threaded into the cylindrical anchorage pin 39 and before the said cylindrical anchorage pin 39 is telescoped into the T-slot 26. The stanchions 25 are generally triangular in shape with the upper half socket 43 formed integral therewith at the bottom thereof, each stanchion 25 being particularly formed and provided with upper and lower fixed pivots 31 and 32 respectively and a stop 38 as hereinafter more fully described in detail.

To secure the stanchions 25 to the convertible body 23, the brackets 20 are first located opposite each other and are fixed to the top rail 22 and side panel 230 of the convertible body 23 as best shown in Figs. 1, 2, 7 and 8. A sub-assembly is then made of a ball 41 with a lower half socket 42 telescoped over the threaded stem 410 thereof and an anchorage nut 47 threaded on the said threaded stem 410 of the ball 41. The cylindrical anchorage pin 39 is then threaded onto the lower end of the threaded stem 410 of the ball 41 and is inserted into the T-slot 26, see Figs. 4 and 7. The said assembly can be adjusted either to the right or left with respect to the bracket 20 as indicated by the dot and dash lines in Fig. 4. After the assembly is in its correct position with the lateral distance between like assemblies on opposite sides of the convertible body 23 precisely as required, the anchorage nut 47 is tightened firmly against the top of the bracket 20 by applying a wrench over the flat sides 470 thereof. This will leave the lower half socket 42 relatively loose so that it may be oriented and tilted to the desired angle. To accomplish proper alignment and tilt of the stanchions 25, they are lightly secured onto and over the balls 41 by means of securing studs 44 positioned through the apertured ears 420 and 430 of the lower half socket 42 and the upper half socket 43 respectively. As soon as each of the stanchions 25 are properly aligned and tilted using the windshield 28 as a template, the securing studs 44 are pulled up tightly with a wrench whereupon the stanchions 25 become fixed in the desired tilted position. This construction enables windshields for the rear seat of convertibles to be properly aligned and tilted while compensating for irregularities in the alignment and spacing of the side panels 230 of the body 23 of convertibles thereby making possible the fitting of windshields for convertibles to a reasonable range of convertible bodies with a single model or with a minimum of models.

Each stanchion 25 is generally T-shaped in cross section and is formed with upper and lower barrels 48 extending laterally from the main body portion thereof leaving a vertical space 49 therebetween. At the rear of each of the said stanchions 25 is disposed a stop 38 located in vertically spaced relationship between the said upper and lower barrels 48, which stop 38 is employed to limit the rearward movement of the windshield 28 past the center of the stanchion 25. Each of the upper and lower barrels 48 of each stanchion 25 is bored vertically at 480 to accommodate the upper and lower fixed pivots 31 and 32 respectively. Except as to their location in the stanchion 25 the upper and lower fixed pivots 31 and 32 are identical in construction and preferably comprise a pin 310 and 320 respectively which is pressed into the bore 480 of the upper and lower barrels 48 respectively and extend therebelow and thereabove respectively to provide additional steps for the windshield 28. A relatively hard yet resilient rubber or like cupped fixed pivot element 311 and 321 respectively is pressed and cemented or otherwise secured in a shallow bore provided in the exposed ends of the fixed pins 310 and 320 respectively as best shown in Figs. 3 and 4. These fixed pivot elements 311 and 321 receive the upper and lower retractable pivot pins 33 and 34 as more fully described hereinafter.

The windshield 28 is preferably formed of a sheet of glass, laminated glass, Plexiglas or a like transparent plastic or other suitable material 280 and is provided with a bottom frame 29 and end frames 30. The top of the Plexiglas sheet 280 is curved rearwardly at a point 2800 slightly above the level of the top of the end frames 29 and 30 to a rearward angle sufficient to strengthen the Plexiglas sheet 280 and to provide a desirable air flow over the top of the windshield 28 to avoid as nearly as possible air turbulence in the rear seat of a convertible equipped with a rear seat windshield embodying the invention. This construction provides ample strength for the Plexiglas 280 of the windshield 28 and avoids the necessity of running a frame member or reinforcing strip across the top of the windshield 28. The bottom frame 29 is preferably constructed in the form of a channel and has therein a rubber or felt cushioning channel 50 disposed around the bottom edge of the Plexiglas sheet 280. Suitable telescopic studs 51 through the bottom frame 29, the cushioning channel 50 and the Plexiglas sheet 280 secure the said bottom frame to the Plexiglas sheet 280, see Fig. 11. The end frames 30 are each formed to provide a channel 52 therealong into which is positioned one side of the Plexiglas sheet 280 with a rubber of felt cushioning channel 53 disposed around the side and end of the Plexiglas sheet 280, see Figs. 4, 6 and 9. Telescopic studs 51 disposed through the end frames 30 also secure the Plexiglas sheet 280 and the cushioning channel 53 thereinto. The bottom frame 29 is suitably formed at its ends to telescope into the end frames 30 whereby to provide a neat and sturdy joint therebetween as best illustrated in Fig. 4.

Each end frame 30 of the windshield 28 is provided with a tubular barrel 54 preferably formed integral therewith, which tubular barrel 54 is of such length and size as to dovetail between the upper and lower barrels 48 of a stanchion 25 and become aligned with the said upper and lower barrels 48 of a stanchion 25 when positioned therebetween with the said barrel 54 of the windshield end frame 30 disposed against the stop 38 of the stanchion 25. The tubular barrel 54 of each end frame 30 is preferably longer than the distance between the extending ends of the upper and lower fixed pivots 31 and 32 of the stanchions 25 and has notches 55 cut therein at the rear and top thereof as best shown in Figs. 3, 4, 5, 6 and 9 to permit the said tubular barrels 54 of each end frame 30 to slide onto the said upper and lower fixed pivots 31 and 32 and stop thereagainst when an end frame 30 of the windshield 28 is swung or positioned into a stanchion 25 with the tubular barrel 54 of the end frame 30 in dovetailed relationship between the upper and lower barrels 48 of the said stanchion 25.

The tubular barrel 54 of each end frame 30 is interiorly threaded at its upper and lower ends to accommodate annular guides 56 for the upper and lower retractable pivot pins 33 and 34, which annular guides 56 are threaded into the ends of the tubular barrel 54. Each of the said annular guides 56 serve also for spring stops for the compression springs 36 as hereinafter described. A generally oval shaped flat cam 35 having concaved lands 350 on the ends thereof is journaled in the tubular barrel 54 of each end frame 30 on a bearing 57 as best illustrated in Figs. 3, 4 and 5, and the said oval cam 35 is keyed on a square cam shaft 58 over which the said bearings 57 telescope. The said bearings 57 fit into a suitable transverse bore 570 provided through the said tubular barrel 54. The said tubular barrel 54 is slotted at 540 and 541 to permit the oval shaped flat cam 35 to be turned from its vertical position shown in Fig. 4 to its horizontal position shown in Fig. 5. Studs 370 secure the operating handle 37 in keyed relationship onto the extending ends of the square cam shaft 58.

Reciprocatingly mounted in the said tubular barrel 54 of each end frame 30 are the upper and lower retractable pivot pins 33 and 34 respectively which are disposed between the oval cam 35 and the upper and lower annular guides 56 respectively. Each of the upper and lower retractable pivot pins 33 and 34 are formed to provide semi-spherical cam followers 59 and 60 respectively on their inner ends and are shouldered at 61 and 62 respectively to provide abutments for the compression springs 36 disposed around the said upper and lower retractable pivot pins 33 and 34 between the said abutments 61 and 62 and the guides 56 through which the said upper and lower retractable pivot pins 33 and 34 reciprocate. The extreme outer ends of the said upper and lower retractable pivot pins 33 and 34 are preferably formed semi-spherically to engage the cupped fixed pivot element 311 and 321 of the upper and lower fixed pivots 31 and 32 respectively as best shown in Figs. 3 and 4. With the foregoing construction, the upper and lower retractable pivot pins 33 and 34 respectively are constantly urged against the cam 35. When the operating handles 37 have been turned so that the cam 35 is in a horizontal position as viewed in Fig. 5, the upper and lower pivot pins 33 and 34 are retracted. When the operating handles 37 are turned ninety degrees from their horizontal position shown in Fig. 5 to their vertical position shown in Fig. 4, the cam 35 has been rotated to its vertical position shown in Fig. 4, the cam 35 has been rotated to its vertical position and the upper and lower retractable pivot pins 33 and 34 respectively have been urged by the said cam 35 outwardly into firm engagement into and with the upper and lower fixed pivots 31 and 32 of the stanchion 25. When the said cam 35 is in its vertical position as shown in Fig. 4, the semi-spherical cam followers 59 and 60 of the upper and lower retractable pivot pins 33 and 34 respectively are spring urged into the concaved lands 350 of the said cam 35, and the said retractable pivot pins 33 and 34 are latched into the fixed pivots 31 and 32 respectively. Thus, the windshield 28 is releasably pivoted and latched in the stanchions 25 is such a manner as to permit the windshield 28 to be unlatched and swung open conveniently from either side of a convertible, or removed therefrom when its use is not desired. When so latched, the said windshield 28 is firmly supported in the fixed pivots 31 and 32 of the stanchions 25 on the retractable pivot pins 33 and 34. By turning one of the operating handles 37 at either end of the windshield 28 from its normal latched vertical position, the said retractable pivot pins 33 and 34 in the barrel 54 of the end frame 30 become retracted simultaneously from the fixed pivots 31 and 32 in the barrels 48 of the stanchion 25, thus permitting ingress and egress to and from the rear seat of the convertible 23 from one side thereof when the windshield 28 is swung open on the fixed pivots 31 and 32 located in the barrels 48 of the stanchion 25 at the opposite side of the said convertible 23.

Fig. 12 illustrates a passenger entering one side of a convertible equipped with a windshield 28 embodying the invention, the said windshield being unlatched from the stanchion 25 on the side of the convertible from which the passenger is entering and latched in and swung about the stanchion 25 provided at the other side of the convertible.

Referring now to Figs. 13-16 inclusive, an alternate and preferable means for securing the stanchion 25 in fixed relationship to the brackets 20 is clearly shown. The brackets 20 are formed to conform to the top rail 22 of the side panel 230 of the convertible body 23 and are secured thereto facing each other on opposite sides of the convertible body 23 rearwardly of the doors 24 thereof by such suitable means as self-tapping screws 21, see Figs. 1, 2, 7 and 8. Because of the fact that variations exist in the width of convertible bodies of the same make and year models and to make the windshield 28 fit more than one model, the brackets 20 are preferably provided with T-slots 26 into which a cylindrical anchorage pin 39 is telescoped. The said cylindrical anchorage pin 39 is provided with a threaded aperture 40 diametrically therethrough into which is threaded the threaded stem 410 of the ball 41 of the ball and socket joint 27.

The ball and socket joint 27 is composed of the ball 41 having a threaded depending stem 410, a semi-spherical lower half socket 42 and a semi-spherical upper half socket 43, the latter being formed integral with the bottom of the stanchion 25. The lower half socket 42 and the upper half socket 43 are each provided with apertured ears 420 and 430 respectively through which securing studs 44 are located. The said lower half socket 42 and the said upper half socket 43 are semi-spherically domed on their inner surfaces and are sufficiently shallow that the joint 45 therebetween will not close thereby causing the said half sockets 42 and 43 to squeeze tightly on and become fixed to the ball 41 when the securing studs 44 are tightened. The bottom of the lower half socket 42 is provided with a slotted aperture 46 therein through which the threaded stem 410 of the ball 41 telescopes.

An anchorage nut 67 having flattened sides 670 to accommodate a wrench is threaded onto the threaded stem 410 of the ball 41 after a hexagonal anchorage nut 68 having a concaved top 680 to accommodate the semi-spherical lower half socket 42 is threaded onto the said threaded stem 410 of the ball 41, both before the said threaded stem 410 of the ball 41 is threaded into the cylindrical anchorage pin 39 and before the said cylindrical anchorage pin 39 is telescoped into the T-slots 26.

To secure the stanchions 25 to the convertible body 23, the brackets 20 are first located opposite each other and are fixed to the top rail 22 and side panel 230 of the convertible body 23 as best shown in Figs. 1, 2, 7 and 8. A sub-assembly is then made of a ball 41 with the lower half socket 42 telescoped over the threaded stem 410 thereof and with the concaved topped hexagonal anchorage nut 68 and the flattened sided anchorage nut 67 threaded onto the said threaded stem 410 of the ball 41. The cylindrical anchorage pin 39 is then threaded onto the lower end of the said threaded stem 410 of the ball 41 and is inserted into the T-slot 26, see Figs. 14 and 7. The said assembly can be adjusted either to the right or to the left with respect to the bracket 20 from its position as shown in Fig. 14. After the said assembly is in its correct position with the lateral distance between like assemblies on opposite sides of the convertible body 23 precisely as required, the anchorage nut 67 is tightened firmly against the top of the bracket 20 by applying a wrench over the flat sides 670 thereof. This will leave the lower half socket 42 relatively loose so that it may be oriented and tilted to any desired angle. To accomplish proper alignment and tilt of the stanchions 25, they are lightly secured onto and over the balls 410 by means of securing studs 44 positioned through the apertured ears 420 and 430 of the lower half of the socket 42 and the upper half of the socket 43 respectively. As soon as each of the stanchions 25 are properly aligned and tilted using the windshield 28 as a template, the securing studs 44 are pulled up tightly with a wrench whereupon the stanchions 25 become fixed in the desired tilted position. To securely fix the said stanchions 25 to their aligned and tilted positions, the concaved topped anchorage nut 68 is then turned by a wrench until it is firmly seated with the concaved top 680 thereof tightly urged against the bottom of the semi-spherical lower half socket 42, see Fig. 14. This further anchors and secures the stanchions 25 in their desired fixed relationship with respect to the brackets 20. To further strengthen the joint between the stanchions 25 and the brackets 20, and to reinforce the threaded stem 410 of the ball 41, the top of the anchorage nut 67 is provided with an annular shallow bore 6700, into which it telescoped the lower cylindrical end 6800 of the hexagonal anchorage nut 68. With the foregoing construction, the entire bracket-stanchion assembly becomes effectively an integral whole and adequately withstands the severe torsional and cantilever stresses applied thereto when the stanchions 25 are accidentally bumped or pulled during use and during ingress or egress to and from the rear seat of a convertible equipped with a windshield for the rear seat thereof embodying the invention.

Although but a single embodiment of the invention has been disclosed and described in detail, it is obvious that many changes may be made in the size, shape, arrangement and detail of the various elements of the invention without departing from the spirit and scope thereof as defined by the appended claims.

We claim:

1. A rear seat windshield for convertibles having oppositely disposed doors at the sides thereof comprising a pair of brackets securable to opposite sides of the body of the convertible rearward of the doors thereof, a pair of stanchions each secured to a bracket and each including fixed pivots, a windshield composed of a transparent sheet material including side frames therefor, each side frame including pivot pins adapted to engage the said fixed pivots on the said stanchions and anchor each side frame to each stanchion and permit the windshield to pivot at one side frame with respect to one stanchion when the other side frame is disengaged from the other stanchion, and means for engaging and disengaging the pivot pins of one side frame from the pivots of the adjacent stanchion independently of the other side frame and the other stanchion whereby to permit the swinging of the said windshield selectively with respect to either stanchion.

2. A rear seat windshield for convertibles having oppositely disposed doors at the sides thereof comprising a pair of oppositely disposed brackets conforming to the side panel and top rail of the convertible body secured thereto rearward of the doors thereof, a pair of stanchions including means for securing each of them to a side bracket whereby to admit of lateral and vertically parallel adjustment with respect to each other to compensate for inaccuracies in the convertible body dimensions and alignment, fixed pivots on each stanchion, a windshield composed of a transparent sheet material and bottom and end frames therefor into which the said transparent sheet is mounted, retractable pivot pins in each end frame engageable into the said fixed pivots in each stanchion about which the said windshield may be swung, and means for engaging and disengaging the said pivot pins in each end frame into and from the said fixed pivots in each stanchion.

3. A rear seat windshield for convertibles having oppositely disposed doors at the sides thereof comprising a pair of oppositely disposed brackets secured to the side panels of the convertible body rearward of the doors thereof, a pair of stanchions fixed to the said brackets and extending thereabove each including oppositely disposed vertically spaced fixed pivots, a windshield composed of a sheet of transparent material and a bottom and two end frames therefor into which the said transparent sheet is fixedly mounted, and a pair of upper and lower oppositely disposed pivot pins reciprocatingly mounted in each end frame engageable into the said vertically spaced fixed pivots whereby to permit the said windshield to be fixed to each bracket and swingable with respect to either bracket, and manually operable means for engaging the said pivot pins in each of the said end frames into the fixed pivots in each of the said stanchions.

4. A windshield for the rear seat of convertibles having oppositely disposed doors at the sides thereof comprising a pair of brackets securable to opposite side panels of the convertible body, a pair of stanchions including means for mounting the same on the said brackets, a windshield composed of a sheet of transparent material rearwardly curved across the top thereof and including a bottom frame and end frames into which the said transparent sheet is mounted, cooperating axially aligned fixed pivots and retractable pivots on the said stanchion and windshield end frames adapted to engage each other and removably fix the said windshield to the said brackets and permit the windshield to swing about the pivots at one bracket when the said pivot pins are disengaged from the pivots at the other bracket, and means for engaging and disengaging the pivot pins and pivots at either bracket.

5. In a windshield for convertibles comprising a pair of oppositely disposed brackets securable to opposite sides of the convertible body, a pair of stanchion secured on said brackets and a windshield composed of a sheet of transparent material rearwardly curved across the top thereof including a bottom frame and side frames therefor, and means for pivotally supporting and removably securing each side frame to a bracket, each bracket including a T-slot across the top thereof disposed laterally with respect to the sides of the convertible body, a ball including a threaded stem, a lower half socket having a slotted aperture in the center thereof telescoped over the said threaded ball stem, an anchorage nut having a cupped top surface and a flat bottom surface threaded on the said threaded ball stem, and an anchorage pin threaded on the said threaded ball stem and disposed in the said T-slot, an upper half socket formed on the base of the said stanchion, the said half sockets including mated apertured ears and studs disposed through the said ears securing the said half sockets to the said ball, the said anchorage pin and anchorage nut serving to fix the ball in the desired position laterally with respect to the bracket and the half sockets and studs serving to fix the stanchion in the desired vertical or tilted position.

6. A rear seat windshield for convertibles having oppositely disposed doors at the sides thereof comprising a pair of stanchions including means for securing the said stanchions to opposite side panels of the convertible body rearwardly of the doors thereof and a pair of oppositely disposed and vertically spaced fixed pivots, a sheet of transparent material including a pair of side frames and a bottom frame therefor, a pair of vertically and oppositely disposed reciprocatingly mounted pivot pins disposed in each end frame including springs constantly urging them to a retracted position, manually operated cam means in each end frame disposed between the said pivot pins for urging the pivot pins in anchored pivotal relationship in the said oppositely disposed vertically spaced pivots carried by each stanchion whereby to permit the said windshield to be locked in both stanchions or locked and pivoted in one stanchion and free from the other stanchion to provide ingress and egress to or from the rear seat of the convertible from either side thereof.

7. In combination with a convertible having oppositely disposed doors at the sides thereof, a windshield for the rear seat thereof composed of a sheet of transparent material including a frame therefor, a pair of oppositely disposed brackets secured to the side panels of the convertible rearward of the doors thereof, a laterally slidable and pivotally adjustable stanchion fixed on each bracket, and pivot means hingedly securing the frame at each side of the windshield to a stanchion, and manually operable means for engaging and disengaging the said pivot means at each stanchion whereby to admit of swinging the said windshield with respect to either stanchion and permit ingress and egress at either side of the convertible to the rear seat thereof.

8. In combination with a convertible having oppositely disposed doors at the sides thereof, a windshield for the rear seat thereof composed of a sheet of transparent material including a frame therefor, a pair of oppositely disposed brackets secured to the side panels of the convertible rearward of the doors thereof, a laterally slidable and pivotally adjustable stanchion fixed on each bracket, and retractable pivot means for hingedly engaging the frame at each side of the windshield to a stanchion normally spring loaded to their retracted position, and manually operable means for engaging the said pivot means and extending the same whereby to establish pivotal anchorage at each stanchion, the said windshield being swingable with respect to either stanchion upon disengagement of the pivot means at the other stanchion whereby to permit ingress and egress at either side of the convertible to the rear seat thereof.

9. In combination with a convertible having oppositely disposed doors at the sides thereof, a windshield for the rear seat thereof composed of a sheet of transparent material rearwardly curved along the top thereof and including a frame therefor around the sides and bottom thereof, a pair of oppositely disposed brackets secured to the side panels of the convertible rearward of the doors thereof, a pair of laterally slidable and pivotally adjustable oppositely disposed stanchions fixed to the said brackets in parallel relationship to each other, a pair of vertically spaced oppositely disposed fixed pivots on each stanchion, a pair of oppositely disposed retractable pivots on each windshield side frame dovetailing between the vertically spaced fixed pivots of each stanchion when retracted, and means for expanding and retracting each pair of retractable pivots into engagement with a pair of fixed pivots at a stanchion whereby to engage and disengage the windshield with respect to the said stanchions, the said windshield being fixed to the said stanchions when the retractable pivots are expanded into the fixed pivots at both stanchions and swingable with respect to one stanchion when the retractable pivots are retracted at the other stanchion thus providing ingress and egress to and from the rear seat of the convertible from either side thereof.

10. In combination with a convertible having oppositely disposed doors at the sides thereof, a windshield for the rear seat thereof composed of a sheet of transparent material rearwardly curved along the top thereof and including a frame therefor around the sides and bottom thereof, a pair of oppositely disposed brackets secured to the side panels of the convertible rearward of the doors thereof, a pair of laterally slidable and pivotally adjustable oppositely disposed stanchions fixed to the said brackets in parallel relationship to each other, a pair of vertically spaced oppositely disposed fixed pivots on each stanchion, a pair of oppositely disposed retractable pivots on each windshield side frame dovetailing between the vertically spaced fixed pivots of each stanchion when retracted, means for expanding and retracting each pair of retractable pivots into engagement with a pair of fixed pivots at a stanchion whereby to engage and disengage the windshield with respect to the said stanchions, the said windshield being fixed to the said stanchions when the retractable pivots are expanded into the fixed pivots at both stanchions and swingable with respect to one stanchion when the retractable pivots are retracted at the other stanchion thus providing ingress and egress to and from the rear seat of the convertible from either side thereof, stops carried by each end frame of the windshield engaging the fixed pivots of each stanchion when swung thereagainst, and a stop on each stanchion between the said fixed pivots thereof contactable by the end frame of the windshield adjacent thereto whereby to prevent the end frame being swung to a stanchion from passing rearward of the center of the stanchion.

11. A rear seat windshield for convertibles having oppositely disposed doors at the sides thereof comprising a pair of brackets securable to opposite sides of the convertible rearward of the doors thereof, a pair of stanchions each secured to a bracket and each including oppositely disposed vertically spaced aligned fixed pivots, a windshield composed of a sheet of transparent material rearwardly curved along the top thereof and including a bottom and side frame therefor into which the said transparent sheet is secured, each side frame including oppositely disposed aligned retractable pivot pins engageable into the fixed pivots of one of the said stanchions whereby to anchor each side frame to each stanchion and permit the windshield to pivot at one side frame with respect to one stanchion when the other side frame is disengaged from the other stanchion, and means for engaging and disengaging the pivot pins of one side frame to and from the pivots of the adjacent stanchion independently of the other side frame and the other stanchion whereby to permit the swinging of the said windshield selectively with respect to either stanchion.

12. A rear seat windshield for convertibles having oppositely disposed doors at the sides thereof comprising a pair of brackets securable to opposite sides of the convertible rearward of the doors thereof, a pair of stanchions each secured to a bracket and each including oppositely disposed vertically spaced aligned fixed pivots, a relatively hard yet resilient cupped element disposed in each fixed pivot, a windshield composed of a sheet of transparent material rearwardly curved along the top thereof and including a bottom and side frames therefor into which the said transparent sheet is secured, each side frame including oppositely disposed aligned retractable pivot pins engageable into the resilient cupped element in the fixed pivots of one of the said stanchions whereby to anchor each side frame in rattleproof relationship to each stanchion and permit the windshield to pivot at one side frame with respect to one stanchion when the other side frame is disengaged from the other stanchion, and manually operated cam means for engaging and disengaging the pivot pins of one side frame into and from the resiliently cupped pivots of the adjacent stanchion independently of the other side frame and the other stanchion whereby to permit the swinging of the said windshield selectively with respect to either stanchion.

13. A rear seat windshield for convertibles having oppositely disposed doors at the sides thereof comprising a pair of brackets securable to opposite sides of the convertible rearward of the doors thereof, a pair of stanchions each secured to a bracket and each including oppositely disposed vertically spaced aligned fixed pivots, a relatively hard yet resilient cupped element disposed in each fixed pivot, a windshield composed of a sheet of transparent material and a bottom and side frames therefor into which the said transparent sheet is secured, each side frame including oppositely disposed aligned retractable pivot pins engageable into the resilient cupped element in the fixed pivots of one of the said stanchions whereby to anchor each side frame in rattleproof relationship to each stanchion and permit the windshield to pivot at one side frame with respect to one stanchion when the other side frame is disengaged from the other stanchion, and manually operated cam means including an operating handle therefor for extending the pivot pins of one side frame into the resilient cupped elements of the pivots of the adjacent stanchion independently of the other side frame and the other stanchion whereby to permit the swinging of the said windshield selectively with respect to either stanchion, the cam of the said cam means having oppositely disposed lands therein causing the said pivot pins to remain latched into their extended position into the fixed pivots until released by manual movement of the said operating handle.

14. A rear seat windshield for convertibles having oppositely disposed doors at the sides thereof comprising a pair of brackets securable to opposite sides of the convertible rearward of the doors thereof, a pair of stanchions each including means for securing the same to a bracket in the desired laterally spaced and upwardly parallel relationship and each including oppositely disposed vertically spaced aligned fixed pivots, a relatively hard yet resilient cupped element disposed in each fixed pivot, a windshield composed of a sheet of transparent material rearwardly curved along the top thereof and including a bottom and side frames therefor into which the said transparent sheet is secured, each side frame including oppositely disposed aligned retractable pivot pins engageable into the resilient cupped element in the fixed pivots of one of the said stanchions whereby to anchor each side frame in rattleproof relationship to each stanchion and permit the windshield to pivot at one side frame with respect to one stanchion when the other side frame is disengaged from the other stanchion, and manually operated cam means including an operating handle therefor for extending the pivot pins of one side frame into the resilient cupped elements of the pivots of the adjacent stanchion independently of the other side frame and the other stanchion whereby to permit the swinging of the said windshield selectively with respect to either stanchion, the cam of the said cam means having oppositely disposed lands therein causing the said pivot pins to remain latched into their extended position into the fixed pivots until released by manual movement of the said operating handle.

15. A windshield for the rear seat of convertibles comprising a pair of brackets securable to opposite side panels of the convertible body, a pair of stanchions including means for mounting the same on the said brackets, a windshield composed of a sheet of transparent material rearwardly curved across the top thereof and including a bottom frame and side frames into which the said transparent sheet is mounted, cooperating axially aligned fixed pivots and retractable pivots on the said stanchion and windshield and frames adapted to engage each other and removably fix the said windshield to the said brackets and permit the windshield to swing about the pivots at one bracket when the said pivot pins are disengaged from the pivots at the other bracket, cushioning means disposed in each of the said fixed pivots, and means for engaging and disengaging the pivot pins and pivots at either bracket.

16. A rear seat windshield for convertibles having oppositely disposed doors at the sides thereof comprising a pair of stanchions including means for securing the said stanchions to opposite side panels of the convertible body rearwardly of the doors thereof, a pair of oppositely disposed and vertically spaced fixed pivots on each stanchion, a relatively hard yet resilient cupped element disposed in each of the said fixed pivots, a sheet of transparent material having a rearwardly curved upper portion and including a pair of side frames and a bottom frame, a pair of vertically and oppositely disposed reciprocatingly mounted pivot pins disposed in each end frame including springs constantly urging them to a retracted position, manually operated cam means in each end frame disposed between the said pivot pins for urging the pivot pins in anchored pivotal relationship in said cupped element of the said oppositely disposed vertically spaced pivots carried by each stanchion whereby to permit the said windshield to be locked in anti-rattle relationship in both stanchions or locked and pivoted in anti-rattle relationship in one stanchion and free from the other stanchion to provide ingress and egress to or from the rear seat of the convertible from either side thereof.

17. In a windshield for convertibles comprising a pair of oppositely disposed brackets securable to opposite sides of the convertible body, a pair of stanchions secured on said brackets and a windshield composed of a sheet of transparent material rearwardly curved across the top thereof including a bottom frame and side frames, each stanchion including oppositely disposed vertically spaced aligned fixed pivots and a relatively hard yet resilient cupped element disposed in each fixed pivots, each side frame including oppositely disposed aligned retractable pivot pins engageable into the resilient cupped element in the fixed pivots of one of the said stanchions whereby to anchor each side frame in rattleproof relationship to each stanchion and permit the windshield to pivot at one side frame with respect to one stanchion when the other side frame is disengaged from the other stanchion, and manually operated cam means for engaging and disengaging the pivot pins of one side frame into and from the resilient cupped elements of the pivots of the adjacent stanchion independently of the other side frame and the other stanchion whereby to permit the swinging of the said windshield selectively with respect to either stanchion, each bracket including a T-slot across the top thereof disposed laterally with respect to the sides of the convertible body, a ball including a threaded stem, a lower half socket having a slotted aperture in the center thereof telescoped over the said threaded ball stem, an anchorage nut having a cupped top surface and a flat bottom surface threaded on the said threaded ball stem, and an anchorage pin threaded on the said threaded ball stem and disposed in the said T-slot, an upper half socket formed on the base of the said stanchion, the said half sockets including mated apertured ears and studs disposed through the said ears securing the said half sockets to the said ball, the said anchorage pin and anchorage nut serving to fix the ball in the desired position laterally with respect to the bracket and the half sockets and studs serving to fix the stanchion in the desired vertical or tilted position.

18. A windshield for the rear seat of a convertible having oppositely disposed doors at the sides thereof composed of a sheet of transparent material rearwardly curved along the top thereof and including a frame therefor around the sides and bottom thereof, a pair of oppositely disposed brackets securable to the side panels of the convertible rearward of the doors thereof, a pair of laterally slidable and pivotally adjustable oppositely disposed stanchions including means for fixing the said stanchions to the said brackets in the desired spaced and parallel tilted relationship to each other, a pair of vertically spaced oppositely disposed fixed pivots on each stanchion, a pair of relatively hard yet resilient cupped shaped elements disposed in each of the said fixed pivots, a pair of oppositely disposed retractable pivots on each windshield side frame dovetailing between the vertically spaced fixed pivots of each stanchion when retracted, means for expanding and retracting each pair of retractable pivots into engagement with the said resilient cupped shaped elements of a pair of fixed pivots at a stanchion whereby to engage and disengage the windshield with respect to the said stanchions, the said windshield being fixed to the said stanchions when the retractable pivots are expanded into the said resilient cupped shaped elements of the fixed pivots at both stanchions and swingable with respect to one stanchion when the retractable pivots are retracted at the other stanchion thus providing ingress and egress to and from the rear seat of the convertible from either side thereof, stops carried by each end frame of the windshield engaging the fixed pivots of each stanchion when swung thereagainst and a stop on each stanchion between the said fixed pivots thereof contactable by the end frame of the windshield adjacent thereto whereby to align the retractable pivots when retracted with the said cupped shaped elements of the said fixed pivots and to prevent the end frame being swung to a stanchion from passing rearward of the center of the stanchion.

19. In a rear seat windshield for convertibles, a pair of oppositely disposed brackets securable to opposite sides of the convertible body, a pair of stanchions secured on said brackets, a windshield composed of a sheet of transparent material rearwardly curved across the top thereof including a bottom frame and side frames, and means for pivotally supporting and removably securing each side frame to a bracket, each bracket including a T-slot across the top thereof disposed laterally with respect to the sides of the convertible body, a ball including a threaded stem, a lower half socket having a slotted aperture in the center thereof telescoped over the said threaded ball stem, a pair of anchorage nuts threaded on the said threaded ball stem, the upper anchorage nut having a cupped top surface and the lower anchorage nut having a flat bottom surface and both anchorage nuts being formed to permit a portion of one to telescope within the other, and an anchorage pin threaded on the said threaded ball stem and disposed in the said T-slot, an upper half socket formed on the base of the said stanchion, the said half sockets including mated apertured ears and studs disposed through the said ears securing the said half sockets to the said ball, the said anchorage pin and lower anchorage nut serving to fix the threaded ball stem and ball in the desired position laterally with respect to the bracket, the half sockets and studs serving to fix the stanchion in the desired vertical or tilted position, and the upper anchorage nut serving to lock the stanchion in its fixed vertical or tilted position while both anchorage nuts act as a unit to reinforce the said threaded ball stem.

20. In a rear seat windshield for convertibles, in combination, a pair of oppositely disposed brackets securable to opposite sides of the convertible body, a pair of stanchions secured on said brackets, a windshield composed of a sheet of transparent material rearwardly curved across the top thereof including a bottom frame and side frames, each stanchion including oppositely disposed vertically spaced aligned fixed pivots and a relatively hard yet resilient cupped element disposed in each fixed pivot, each side frame including oppositely disposed aligned retractable pivot pins engageable into the resilient cupped elements in the fixed pivots of one of the said stanchions whereby to anchor each side frame in rattleproof relationship to each stanchion and permit the windshield to pivot at one side frame with respect to one stanchion when the other side frame is disengaged from the other stanchion, and manually operated cam means for engaging and disengaging the pivot pins of one side frame into and from the resilient cupped elements of the pivots of the adjacent stanchion independently of the other side frame and the other stanchion whereby to permit the swinging of the said windshield selectively with respect to either stanchion, each bracket including a T-slot across the top thereof disposed laterally with respect to the sides of the convertible body, a ball including a threaded stem, a lower half socket having a slotted aperture in the center thereof telescoped over the said threaded ball stem, a pair of anchorage nuts threaded on the said threaded ball stem, the upper anchorage nut having a cupped top surface and the lower anchorage nut having a flat bottom surface and both anchorage nuts being formed to permit a portion of one to telescope within the other, and an anchorage pin threaded on the said threaded ball stem and disposed in the said T-slot, an upper half socket formed on the base of the said stanchion, the said half sockets including mated apertured ears and studs disposed through the said ears securing the said half sockets to the said ball, the said anchorage pin and lower anchorage nut serving to fix the threaded ball stem and ball in the desired position laterally with respect to the bracket, the half sockets and studs serving to fix the stanchion in the desired vertical or tilted position, and the upper anchorage nut serving to lock the stanchion in its fixed vertical or tilted position while both anchorage nuts act as a unit to reinforce the said threaded ball stem.

HENRY K. EDLUND.
JOHN G. MONJAR.
GEORGE R. SHUMAN.
RICHARD DE TAMBLE.

No references cited.